United States Patent [19]

Lewis

[11] 4,196,168
[45] Apr. 1, 1980

[54] SLOPED TRAY ARRANGEMENT FOR POLYMERIZATION REACTOR

[75] Inventor: Alan E. Lewis, Kingsport, Tenn.

[73] Assignee: Eastman Kodak Company, Rochester, N.Y.

[21] Appl. No.: 903,368

[22] Filed: May 5, 1978

[51] Int. Cl.² ............................................. B01J 1/00
[52] U.S. Cl. ................................. 422/134; 261/109; 261/112; 422/131; 422/135; 202/158
[58] Field of Search ............... 422/131, 134, 135, 138; 261/109, 112; 422/197, 224; 202/198, 200, 158; 159/49

[56]  References Cited
U.S. PATENT DOCUMENTS

| | | | |
|---|---|---|---|
| 229,585 | 7/1880 | Burcey | 202/158 X |
| 263,852 | 9/1882 | Burcey | 202/198 X |
| 437,193 | 9/1890 | Gray, Jr. | 202/198 X |
| 1,452,253 | 4/1923 | Nevitt | 202/158 X |
| 1,513,354 | 10/1924 | Wadsworth | 202/158 X |
| 2,613,138 | 10/1952 | Van Loon | 422/424 X |
| 2,645,607 | 7/1953 | Allen | 261/112 X |
| 3,250,747 | 5/1966 | Mitchell et al. | 422/131 X |
| 3,841,836 | 10/1974 | Lunsford et al. | 422/134 |

Primary Examiner—Michael S. Marcus
Attorney, Agent, or Firm—Malcolm G. Dunn; Daniel B. Reece, III

[57] ABSTRACT

An improved polymerization reactor apparatus having a vertically disposed outer shell, a liquid polymer inlet at the top of the shell and a liquid polymer outlet at the bottom of the shell, and a series of downwardly sloping trays for conducting a flow of the liquid polymer in a descending path from the inlet to the outlet; the series of trays being encompassed within a series of essentially rectangular pan assemblies supportedly spaced inwardly from the outer shell and by which pan assemblies the liquid polymer flow is divided into two separated flows of uniform flow cross-section, with vapor from the liquid polymer escaping along paths separated from interference with the liquid polymer flow paths from the open top of each pan assembly and through "windows" or openings in two of the opposite end walls of the pan assembly to the outer shell of the reactor apparatus.

3 Claims, 3 Drawing Figures

SLOPED TRAY ARRANGEMENT FOR POLYMERIZATION REACTOR

BACKGROUND OF THE INVENTION

This invention is directed to an improved reactor apparatus, such as for the production of linear polyesters or copolyesters prepared from intermediate ester products of one or more dicarboxylic acids or their esters forming derivatives and one or more glycols, and particularly is directed to an improved sloped tray assignment for such reactor apparatus so as to provide for parallel flow of the liquid polymer and sufficient space for the gaseous by-product, the vapor, to readily escape from the surface of the liquid polymer to enhance the polymerization reaction.

Although the disclosed arrangement may be employed in other reactor apparatus, it is particularly applicable to the lower reactor portion or section disclosed in the Mitchell, Jr. et al U.S. Pat. No. 3,250,747, and Lunsford, Jr. et al U.S. Pat. No. 3,841,836 and is an improvement thereover.

In the latter patented disclosures, a molten prepolymer flows by gravity over the trays disclosed in the patents and is subjected to vacuum pressures of about 0.1 to 5 torr. Due to the viscous nature of these high molecular weight materials, a layer of polymer is built up on the trays which gives the required residence time for reaction to occur. The thickness of the layer is strongly dependent upon the angle from the horizontal of the sloped tray, the flow viscosity, the width of the tray and the mass flow rate of the material being processed. The residence time is therefore a function of the thickness of the layer on the sloped tray, and the number of trays (to the length of the flow path) in the reactor.

In an established or already existing reactor apparatus, the height of the reactor column is fixed. Therefore, to increase residence time of the liquid polymer, such as for the purpose of increasing to inherent viscosity (I.V.), while maintaining a predetermined through-put or production volume of the polymer, only certain structural variables are possible: varying the width of the tray; varying the slope of the tray; and varying the total length of the path of flow (as represented in part by the cumulative length of the individual trays). The width and length of a tray may be increased only to a certain extent within an already existing reactor column. If the slope of a tray should be too shallow for the predetermined through-put, the thickness of the polymer layer may increase to such extent as to overflow from the trays and drop immediately to the bottom of the reactor for exit through the outlet of the reactor. The latter polymer would not have spent the necessary residence time to build up to the predetermined inherent viscosity. If the tray slope is made too steep, the length of the reactor column for the same predetermined through-put or volume of flow is used up too soon without the polymer having reached the predetermined inherent viscosity before exiting from the reactor column.

An objective therefore of this invention is to provide a sloped tray arrangement, which may be used in new as well as already existing reactor columns, for accomplishing the process requirements of adequately thin layers of liquid polymer on the tray, adequate residence time, and the efficient utilization of vertical space within the reactor column.

In order to enhance the polymerization reaction, there should be sufficient space within the reactor for the gaseous by-product, such as glycol vapor in a poly(ethylene terephthalate) polymerization, to easily escape from the liquid polymer surface. There should be no interference of the vapor with the liquid polymer flow or of the liquid polymer flow with the vapor.

The Allen U.S. Pat. No. 2,645,607 discloses one type of a vertically disposed column providing for separate parallel flows of liquid materials to annular frusto conical trays having separate sections into which a liquid material may flow.

Other patents disclosing vertically disposed columns are the Katz U.S. Pat. No. 3,687,425; Nevitt U.S. Pat. No. 1,452,253; Bacon et al U.S. Pat No. 2,195,980; Wadsworth U.S. Pat. No. 1,513,354; and Kunze U.S. Pat. No. 125,463. Although these also are purported to show parallel flows of liquid materials, the flows, however, are not necessarily separated from each other because they flow from one cone-shaped tray to the other. Also, because of their frusto conical shaped trays, the flow cross-section will vary from maximum to minimum along the direction of flow along each tray.

The above-cited Wadsworth patent, for instance, discloses a series of frusto-conical shaped baffles arranged one above the other. The baffles which are labeled "C" are of greater diameter than the baffles which are labeled "B" and are situated beneath a respective baffle "B". The liquid material, oil in this instance, flows radially outwardly on baffle "B" and then radially inwardly on baffle "C", thus following a substantially zig-zag path down through the column in which the baffles are disposed. Vapor from baffle "B" goes off from the top of baffle "B" to the annular space between the side wall of the chamber and the peripheral portions of baffle "B", while vapor from baffle "C" follows along the inclined surface of baffle "B" and is deflected inwardly toward the center of the chamber in a chimney-like or flue-like portion 7 on baffle "B". By this construction, Wadsworth ensures that the vapors travel through the chamber in paths separate and distinct from the path of travel of the downwardly flowing liquid material. The liquid material is oil and the patentee wishes to prevent the vapor from being subjected to a scrubbing action by the oil as the vapor travels upwardly through the chamber.

Another objective of the invention, therefore, is to provide an improved tray arrangement by which the gaseous by-product from the liquid polymer may readily and easily escape from each tray within the tray arrangement along paths separated from interference with the liquid polymer flow paths and at the same time provide for two separate, parallel flow paths of uniform flow cross-section in the direction of liquid polymer flow.

SUMMARY OF THE INVENTION

The invention, therefore, is directed to an improved polymerization reactor which has a vertically disposed outer shell, a liquid polymer inlet at the top of the shell and a liquid polymer outlet at the bottom of the shell, and a series of downwardly sloping trays for conducting a flow of the liquid polymer in a descending path from the liquid polymer inlet to the liquid polymer outlet.

A series of essentially rectangular pan assemblies, which are supportedly spaced inwardly from the outer shell, are vertically disposed one above another and serve to encompass the sloping trays and to divide the trays into separate halves for conducting the liquid polymer flow from the liquid polymer inlet to the liquid polymer outlet into two separate flows.

Each pan assembly has four end walls and is open at the top for escape of vapor from the liquid polymer flow to the outer shell, and defines in its bottom wall a bottom opening for through flow of the liquid polymer. The bottom wall itself defines a pair of oppositely sloped lower trays included in the aforementioned downwardly sloping trays and extending radially inwardly and downwardly toward the bottom opening. The pan assembly has spaced above the lower trays a pair of oppositely sloped upper trays, also included in the aforementioned downwardly sloping trays, which upper trays are spaced inwardly from two opposite end walls of the pan assembly and extend radially outwardly and downwardly for conducting the liquid polymer to the lower trays, and are connected at the sides to the two other opposite end walls. A baffle arrangement extends above and midway of the ends of the upper trays across the surface thereof to separate the liquid polymer flow in one of the upper trays from the other. The pan assembly also defines "windows" or openings in its two aforementioned other opposite end walls between the upper and lower trays adjacent the sides of the trays for escape of the vapor from the liquid polymer flow in the lower trays to the outer shell.

A liquid polymer distributor arrangement is disposed below the liquid polymer inlet and within the first pan assembly of the series of pan assemblies and serves to distribute the flow of liquid polymer equally to each of the upper trays for such first pan assembly.

The trays may have a slope angle ranging from about 2° to about 30° below the horizontal plane. The angle of the trays may be increased from the top trays to the bottom trays to accommodate increased viscosity due to liquid polymerization.

DESCRIPTION OF THE PREFERRED EMBODIMENT

Figure 1:
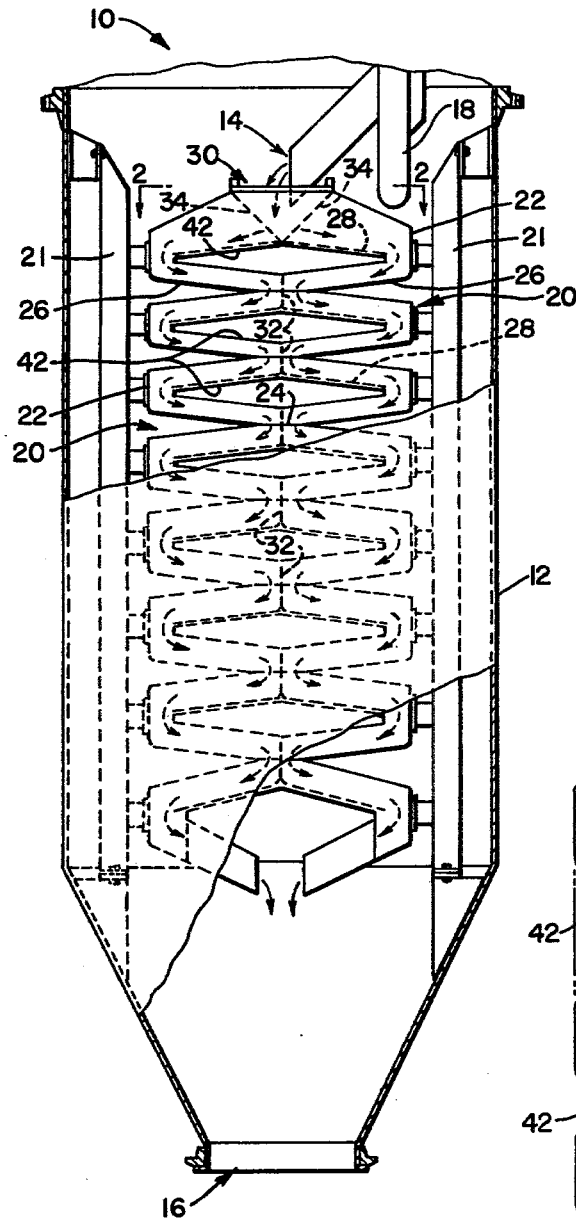
FIG. 1 is an elevational view of the improved reactor apparatus partly broken away and showing the outer shell in cross-section and the upper three and lowest pan assemblies, the arrows indicating the path of flow of the liquid polymer.

In reference to the drawings, the improved reactor apparatus is shown at 10 in FIG. 1 and has a vertically disposed outer shell 12, an inlet 14 at the top of the outer shell for entrance of a liquid polymer (not shown) into the reactor apparatus, and an outlet 16 at the bottom of the outer shell for exit of the liquid polymer from the reactor apparatus.

The liquid polymer may enter the reactor apparatus from another reactor in the course of reaction and build-up of inherent viscosity (I.V.) of the polymer or from an upper reactor portion (not shown), such as disclosed in the Mitchell, Jr. et al U.S. Pat. No. 3,250,747 or in the Lunsford, Jr. et al U.S. Pat. No. 3,841,836, through a liquid seal at 18, the liquid seal serving to enable the two reactor portions to be at different predetermined pressures in the manner more fully disclosed and described in the two above-cited patents.

The liquid polymer enters at the top of the reactor apparatus through inlet 14 for subsequent flow in a descending path along a series of downwardly sloping trays to the liquid polymer outlet 16 for exit therefrom at the bottom of the reactor apparatus.

The improvement in the reactor apparatus is in the pan assembly 20, which encompasses the sloping trays, divides the trays into separate halves for conducting the liquid polymer flow from the inlet to the outlet, and insures ready removal of vapor from the liquid polymer flowing paths of uniform flow cross-section along the length of the trays.

Each pan assembly 20 of the series of pan assemblies is supportedly spaced inwardly by supports 21 from the outer shell 12 so as to leave space for the vapor to escape from the trays to the outer shell for subsequent removal from the reactor apparatus.

Figure 3:
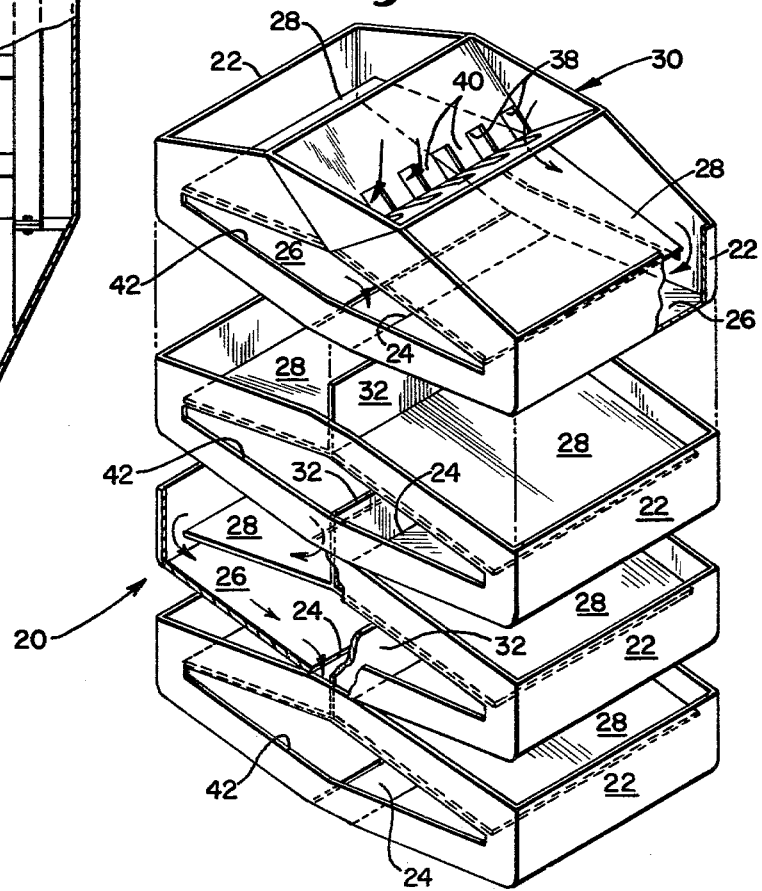
FIG. 3 is an enlarged isometric view of the distributor arrangement and the upper four pan assemblies with the end wall and baffle arrangement of the third pan assembly partly broken away, the arrows again indicating the path of flow of the liquid polymer.

Each pan assembly 20 is essentially rectangular, has four end walls 22, and is open at the top, as may be seen also from FIG. 3. The bottom wall of the pan assembly defines a bottom opening 24 and a pair of oppositely sloped lower trays 26 extending radially inwardly and downwardly toward the bottom opening 24. Spaced above the lower trays within the pan assembly is a pair of oppositely sloped upper trays 28 that extend radially outwardly and downwardly and have outer ends that are spaced inwardly from two of the opposite end walls of the pan assembly so as to provide space for conducting the liquid polymer flow from the upper trays to the lower trays. The upper trays are supported by and are secured by their edges to the other of the two opposite end walls 22 of the pan assembly.

The upper trays in effect form a "roof" for the pan assembly while the lower trays form a "trough" therefor leading to the opening in the bottom of the pan assembly.

To ensure separate and equal flows of the liquid polymer to the trays, a distributor arrangement 30 is positioned within the uppermost pan assembly and below the liquid polymer inlet 14 for separating the flow to the pair of upper trays in the uppermost pan assembly, and then a baffle arrangement 32 is disposed above each upper tray pair in the subsequent pan assemblies. The baffle arrangement constitutes "baffle means", which extends above and midway of the ends of the upper trays across the surface thereof to separate the liquid polymer flow in one of the upper trays from the other.

Figure 2:
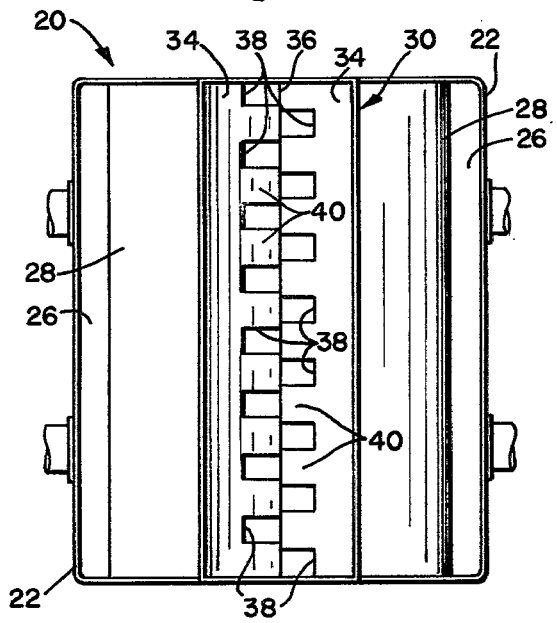
FIG. 2 is a plan view of the uppermost pan assembly and of the distributor arrangement for distributing the liquid polymer equally tp each of the two upper trays in the uppermost or first of the pan assemblies.

The distributor arrangement 30 is in the form of a V-shaped trough, which is centrally disposed with respect to the upper trays and extends across the width of the upper trays. The trough has downwardly sloped walls 34 that intersect at the bottom 36 (FIG. 2) and that define therewithin a series of openings 38 (FIG. 2 and FIG. 3) spaced alternately along the walls first in one and then the other for flow of the liquid polymer therethrough. Each opening 38 is separated from another opening by partition walls 40 extending across the V- shaped trough to insure separation of the liquid polymer flow from adjacent openings. In viewing FIG. 2, the opening 38 that is shown at the top of the drawing is illustrated as being to the left of the bottom or bottom intersection 36, the area opposite the opening and to the right of the bottom intersection 36 from the topmost illustrated opening is shown as being to the right of the bottom intersection 36, etc., across the distributor arrangement.

Vapor from the liquid polymer flows in the upper trays 28 escapes from the upper trays through the opening top of the pan assembly to the outer shell 12 while vapors from the lower trays escape through special "windows" or openings 42 formed in two of the opposite end walls 22 between the upper and lower trays adjacent the side edges of the trays. The vapor thus escapes along paths that do not interfere with the liquid polymer flow paths.

In operation, therefore, the liquid polymer (as shown by the arrows) flows into the reactor apparatus 10 through the inlet 14 and into the distributor arrangement 30 for distribution first to one side and then the other of the upper trays 28 on either side of the baffle arrangement 32. The polymer flows from the upper trays to the lower trays, and from the latter trays to the upper trays 28 of the next lower pan assembly 20.

It is essential to maintain a predetermined thickness of liquid polymer on each tray, and to this end the various partitions and baffles ensure that the flow from one side of the reactor does not extend over to the other side and thus cause the layer thickness to vary appreciably from the predetermined thickness.

Any number of pan assemblies may be used, depending upon the predetermined residence time for the polymer.

The slope on the lower trays of the last pan assembly may be increased, as illustrated in FIG. 1 so as to compensate for rapid build-up of the inherent viscosity and otherwise slower flow of the liquid polymer.

The improved tray arrangement thus has the advantage of reducing the vertical distance that would otherwise be required by a single path tray arrangement designed to meet the same processing objectives.

The invention has been described in detail with particular reference to certain preferred embodiments thereof, but it will be understood that variations and modifications can be effected within the spirit and scope of the invention.

I claim:

1. An improved polymerization reactor having a vertically disposed outer shell, a liquid polymer inlet at the top of the shell and a liquid polymer outlet at the bottom of the shell, and a series of downwardly sloping trays for conducting a flow of the liquid polymer in a descending path from the liquid polymer inlet to the liquid polymer outlet;

the improvement comprising:

a series of essentially rectangular pan assemblies supportedly spaced inwardly from said outer shell in vertical disposition one above the other for encompassing said downwardly sloping trays and for dividing the liquid polymer flow from said liquid polymer inlet to said liquid polymer outlet into two separate flows of uniform flow cross-section;

each pan assembly having four end walls and being open at the top for escape of vapor from the liquid polymer flow to the outer shell and defining in its bottom wall a bottom opening for through flow of the liquid polymer, the bottom wall defining a pair of oppositely sloped lower trays which are included in said downwardly sloping trays, said lower trays extending radially inwardly and downwardly toward the bottom opening; the pan assembly having spaced above the lower trays a pair of oppositely sloped upper trays which are also included in said downwardly sloping trays; said upper trays extending radially outwardly and downwardly for conducting the liquid polymer to the lower trays and having outer ends spaced inwardly from two opposite end walls of the pan assembly and being connected at the sides to the two other opposite end walls; and baffle means extending above and midway of the ends of the upper trays across the surface thereof to separate the liquid polymer flow in one of the upper trays from the other; and the pan assembly further defining openings in its said two other opposite end walls between the upper and lower trays adjacent the sides of the trays for escape of the vapor from the liquid polymer flow in the lower trays to the outer shell; and means disposed above one of said baffle means and disposed below the liquid polymer inlet and within the first pan assembly of the series of pan assemblies for distributing the flow of the liquid polymer equally on either side of said one of said baffle means to each of the upper trays for said first pan assembly.

2. An improved polymerization reactor as defined in claim 1, wherein said trays each have a slope angle ranging from about 2° to about 30° below the horizontal plane.

3. An improved polymerization reactor as defined in claim 1, wherein said means for distributing the liquid polymer comprises a V-shaped trough centrally disposed with respect to and extending across the width of the upper trays in the first pan assembly, the trough having downwardly sloped walls intersecting at the bottom, the walls defining therewithin openings spaced alternately along the walls first in one and then the other for flow of liquid polymer downthrough and having extending thereacross partition means separating each opening and its downthrough flow of liquid polymer from another opening.

* * * * *